United States Patent
Miyata et al.

(10) Patent No.: US 6,965,728 B1
(45) Date of Patent: Nov. 15, 2005

(54) DIGITAL RECORDING APPARATUS

(75) Inventors: Kazunori Miyata, Neyagawa (JP);
Kazuhiko Nakamura, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 780 days.

(21) Appl. No.: 09/630,815

(22) Filed: Aug. 2, 2000

(30) Foreign Application Priority Data

Aug. 5, 1999 (JP) .................................. 11-222811

(51) Int. Cl.$^7$ ............................................. H04N 7/26
(52) U.S. Cl. ........................ 386/109; 386/94; 348/476
(58) Field of Search ...................... 375/240.25; 386/94, 386/109; 348/476

(56) References Cited

U.S. PATENT DOCUMENTS

| | | | |
|---|---|---|---|
| 5,617,145 A * | 4/1997 | Huang et al. | 348/423.1 |
| 5,798,798 A * | 8/1998 | Rector et al. | 348/476 |
| 5,963,256 A * | 10/1999 | Tahara | 348/385.1 |
| 6,134,381 A * | 10/2000 | Takahashi et al. | 386/68 |
| 6,148,141 A * | 11/2000 | Maeda et al. | 386/112 |
| 6,421,080 B1 * | 7/2002 | Lambert | 348/143 |
| 6,476,858 B1 * | 11/2002 | Diaz et al. | 348/159 |
| 6,504,850 B1 * | 1/2003 | Kato et al. | 370/465 |

FOREIGN PATENT DOCUMENTS

| | | |
|---|---|---|
| JP | 04145781 A | 5/1992 |
| JP | 05064143 A | 3/1993 |
| JP | 07162850 A | 6/1995 |
| JP | 08237600 A | 9/1996 |
| JP | 10066082 A | 3/1998 |
| JP | 10150633 A | 6/1998 |
| JP | P2000-125255 A | 4/2000 |

* cited by examiner

*Primary Examiner*—James J. Groody
*Assistant Examiner*—Alicia M. Duggins
(74) *Attorney, Agent, or Firm*—Arent Fox PLLC

(57) ABSTRACT

A digital recording apparatus includes a compression device that performs, every time a signal corresponding to one field is inputted, compression processing using a compression rate stored in by-channel compression rate storage area, corresponding to the inputted signal, in a storage device. A compression rate control device updates, every time the signal corresponding to one field has been compressed by the compression device, the compression rate stored in the by-channel compression rate storage area, corresponding to the inputted signal, in the storage device to such a value that an amount of coding after the compression approaches a predetermined target amount of coding on the basis of the amount of coding after the compression and the target amount of coding.

2 Claims, 2 Drawing Sheets

DIGITAL RECORDING APPARATUS

BACKGROUND OF THE INVENTION

1. Field of the Invention

The present invention relates to a compression rate control method in a digital recording apparatus such as a digital VTR.

2. Background of the Invention

In a digital VTR, input image data is recorded on a video tape after it is compressed by an image compressing circuit such as a JPEG (Joint Photographic Experts Group) compressing circuit. When a compression rate in the image compressing circuit is increased, an amount of coding after the compression is decreased. When the amount of coding is small, a recording time period during which the data can be recorded on the video tape is lengthened. On the other hand, when the compression rate is decreased, the amount of coding after the compression is increased. When the amount of coding is large, the recording time period during which the data can be recorded on the video tape is shortened.

Used as the digital VTR is one capable of selecting a recording mode corresponding to the recording time period, for example, a normal time mode, a longtime mode, and a 12-hour recording mode. In the digital VTR, the amount of coding after the compression must be converged on a predetermined value depending on each of the recording modes.

For example, when image data corresponding to 12 hours is recorded on the video tape, an amount of coding per field for satisfying the recording mode is calculated from a compressing method and a recording format. The compression rate is calculated using the calculated amount of coding as a target amount of coding per field.

Suppose a case where an image obtained by subjecting images respectively picked up by a plurality of monitoring cameras, four monitoring cameras A, B, C, and D, to time division multiplexing is recorded by one digital VTR. Since each of the monitoring cameras is normally fixed, the images respectively picked up by the monitoring cameras differ, while the image picked up by one of the monitoring cameras is not so changed in many cases.

Letting a, b, c, and d be amounts of coding per field in cases where the images picked up by the monitoring cameras A, B, C, and D are compressed at the same compression rate. It is assumed that the amount of coding a is the smallest of the amounts of coding a, b, c, and d.

In such a case, when a compression rate corresponding to a target amount of coding dependent on the recording mode is calculated using the amount of coding a, which is the smallest, of the monitoring camera A, for example, as a basis, and the compression rate is also applied to a case where the images picked up by the other monitoring cameras B, C, and D are compressed, it is a compression rate suitable for an input signal from the monitoring camera A, while not being a compression rate suitable for input signals from the other monitoring cameras A, B, C, and D.

It is also considered that the average of the amounts of coding a, b, c, and d per field by the monitoring cameras A, B, C, and D is found, to calculate a compression rate corresponding to the target amount of coding dependent on the recording mode using the obtained average as a basis. However, it is not a compression rate suitable for each of the input signals from the monitoring cameras B, C, and D.

SUMMARY OF THE INVENTION

An object of the present invention is to provide a digital recording apparatus capable of carrying out control such that when an image signal obtained by subjecting signals on a plurality of channels to time division multiplexing is compressed and is then recorded, an amount of coding after the compression is an amount of coding corresponding to a target amount of coding as well as compressing the signals on the channels at compression rates respectively suitable for the signals.

In a digital recording apparatus to which a signal obtained by subjecting signals on a plurality of channels to time division multiplexing is inputted, the digital recording apparatus according to the present invention is characterized by comprising storage means having a by-channel compression rate storage area for storing a compression rate for each of the channels; compression means for performing, every time the signal corresponding to one field is inputted, compression processing using the compression rate stored in the by-channel compression rate storage area, corresponding to the inputted signal, in the storage means; and compression rate control means for updating, every time the signal corresponding to one field has been compressed by the compression means, the compression rate stored in the by-channel compression rate storage area, corresponding to the inputted signal, in the storage means to such a value that an amount of coding after the compression approaches a predetermined target amount of coding on the basis of the amount of coding after the compression and the target amount of coding.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
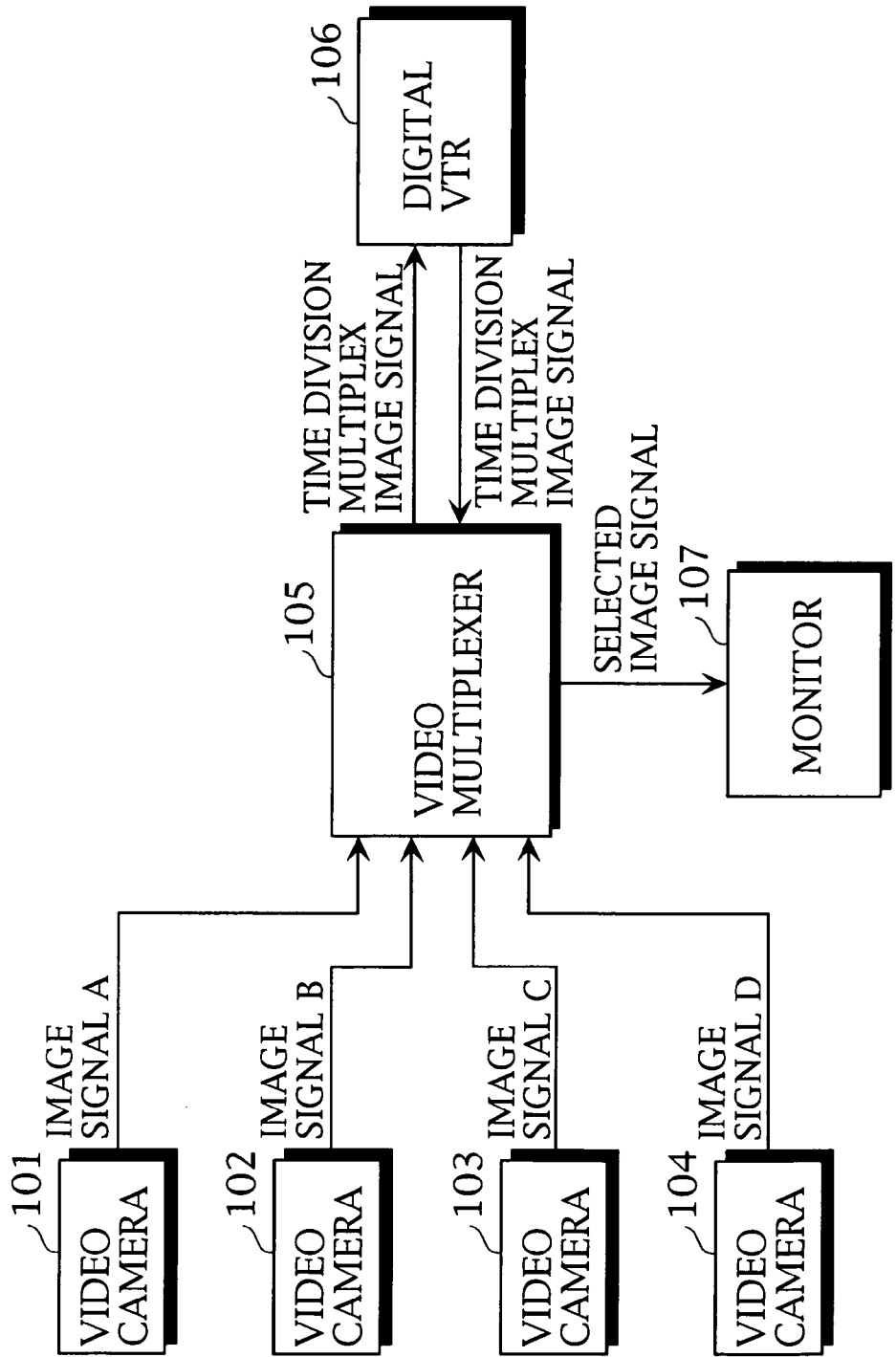
FIG. 1 is a block diagram showing the configuration of a monitoring system.

Referring now to the drawings, description is made of an embodiment in a case where the present invention is applied to a digital VTR for recording and reproducing images picked up by a plurality of monitoring cameras.

[1] Description of Configuration of Monitoring System

FIG. 1 illustrates the configuration of a monitoring system.

The monitoring system comprises four video cameras (hereinafter referred to as monitoring cameras) 101 to 104, a video multiplexer (a frame switcher) 105 receiving image signals A to D obtained by the monitoring cameras 101 to 104 as inputs for generating a time division multiplex image signal, a digital VTR for compressing the time division multiplex image signal generated by the video multiplexer 105 and recording the compressed time division multiplex image signal on a video tape, and a monitor 107 for displaying the image signal, selected by the video multiplexer 105, in the time division multiplex image signal reproduced by the digital VTR 106.

The video multiplexer 105 successively switches and outputs for each of the monitoring cameras the image signal outputted for each field period such that it outputs the image signal A from the monitoring camera 101 in one field period, outputs the image signal B from the monitoring camera 102 in the succeeding field period, outputs the image signal C from the monitoring camera 103 in the succeeding field period, and outputs the image signal D from the monitoring camera 104 in the succeeding field period. An image signal obtained by subjecting the image signals from the plurality of monitoring cameras 101 to 104 to time division multiplexing is referred to as a time division multiplex image signal.

Information representing the camera numbers A, B, C, and D indicating which of the monitoring cameras 101 to 104 outputs each of the image signals A to D are multiplexed on fields of the time division multiplex image signal outputted from the video multiplexer 105 in a vertical blanking period. The information multiplexed in the vertical blanking period shall be referred to as a VBI signal.

The time division multiplex image signal outputted from the video multiplexer 105 is fed to the digital VTR 106. In the digital VTR 106, the fed time division multiplex image signal is compressed by a JPEG type image compressing circuit and is recorded on a video tape.

At the time of reproduction, the video multiplexer 105 reads the VBI signal for each field from a reproduced output (a time division multiplex image signal) from the digital VTR 106, to judge whether or not an image in the field is a image signal to be presented on the basis of the camera number represented by the read VBI signal. When it is judged that the image is an image signal to be presented, the image in the field is stored in an image memory in the video multiplexer 105. When images corresponding to a predetermined number of fields are stored in the image memory, the image is read out of the image memory, and is displayed by the monitor 107.

[2] Description of Method of Controlling Compression Rate by Digital VTR 106

In the digital VTR 106, a recording mode corresponding to a recording time period, for example, a normal time mode or a long time mode can be selected. A target amount of coding per field (an initial value of the target amount of coding) is previously found depending on the recording mode. A compression rate corresponding to the target amount of coding (an initial value of the compression rate) is previously determined.

Areas storing compression rates $X_A$, $X_B$, $X_C$, and $X_D$ respectively suitable for the camera numbers A, B, C, and D (by-camera compression rate storage areas) are provided in a memory of the digital VTR 106.

Figure 2:
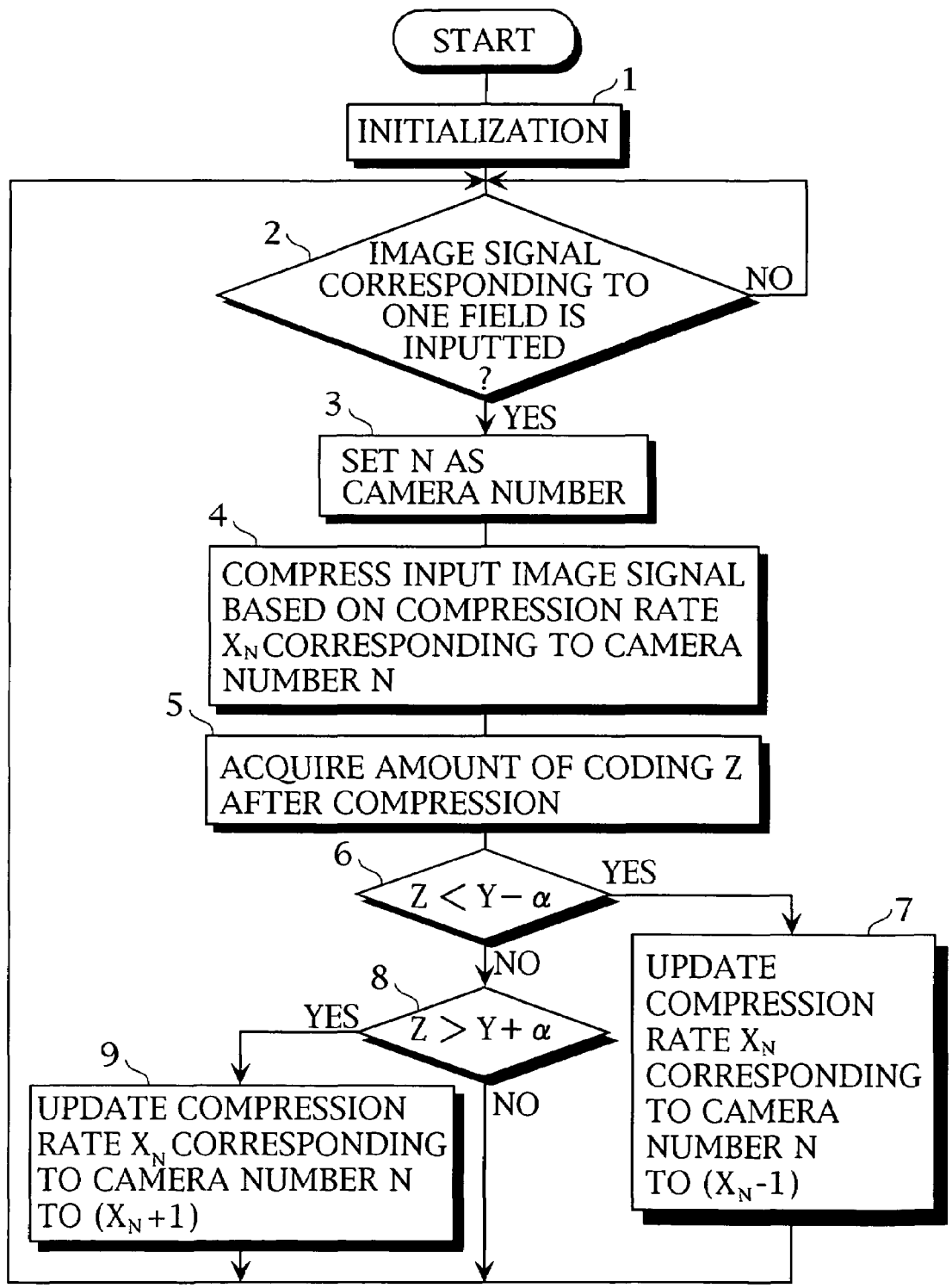
FIG. 2 is a flow chart showing the procedure for compression rate control processing by a digital VTR 106.

FIG. 2 shows the procedure for compression rate control processing by the digital VTR 106.

Initialization is first performed (step 1). That is, an initial value of a target amount of coding suitable for a recording mode currently set is set as a target amount of coding Y. Further, an initial value of a compression rate suitable for the recording mode currently set is set as a compression rate $X_A$, $X_B$, $X_C$, or $X_D$ by camera numbers in each of the by-camera compression rate storage areas.

When a image signal corresponding to one field is inputted (step 2), a variable N representing a camera number is set as a camera number (A to D) corresponding to the image signal (step 3), and the inputted image signal is then compressed on the basis of the compression rate $X_N$, stored in the by-camera compression rate storage area, corresponding to the set camera number N (step 4).

When the image signal corresponding to one field has been compressed, an amount of coding (an amount of coding corresponding to one field) Z after the compression is acquired (step 5). It is judged whether or not the acquired amount of coding Z is smaller than a value (Y−α) obtained by subtracting a predetermined value α from the target amount of coding Y (step 6). When it is assumed that the target amount of coding Y is 54 [Kbyte], and the predetermined value α is 4 [Kbyte], it is judged whether or not the acquired amount of coding Z is smaller than 50 [Kbyte].

When the acquired amount of coding Z is smaller than the value (Y−α) obtained by subtracting the predetermined value α from the target amount of coding Y (Z<(Y−α)), the compression rate $X_N$, stored in the by-camera compression rate storage area, corresponding to the camera number N is updated to ($X_N$−1) (step 7). The program is returned to the step 2.

When it is judged at the foregoing step 6 that the acquired amount of coding Z is not smaller than the value (Y−α) obtained by subtracting the predetermined value α from the target amount of coding Y, it is judged whether or not the acquired amount of coding Z is larger than a value (Y+α) obtained by adding the predetermined value α to the target amount of coding Y (step 8).

If the acquired amount of coding Z is larger than the value (Y+α) obtained by adding the predetermined value α to the target amount of coding Y (Z>(Y+α)), the compression rate $X_N$ stored in the by-camera compression rate storage area corresponding to the camera number N is updated to ($X_N$+1) (step 9). The program is returned to the step 2.

When it is judged at the foregoing step 8 that the acquired amount of coding Z is not larger than the value (Y+α) obtained by adding the predetermined value α to the target amount of coding Y, that is, (Y−α)≦Z≧(Y+α), the program is returned to the step 2.

Examples of a method of performing compression corresponding to the compression rate $X_N$ at the foregoing step 4 include a method of previously preparing a plurality of quantization tables corresponding to a plurality of types of compression rates and performing compression on the basis of the quantization table corresponding to the compression rate $X_N$, and a method of changing a quantization scale factor into a value corresponding to the compression rate $X_N$ using the same quantization table.

In the former method, when an image in a certain field is subjected to the compression corresponding to the compression rate $X_N$, compression data in the field as well as the quantization table used in compressing the image in the field are stored in the video tape. When the image in the field is reproduced, the compression data in the field is expanded using the quantization table recorded on the video tape.

In the latter method, when an image in a certain field is subjected to the compression corresponding to the compression rate $X_N$, compression data in the field as well as the quantization scale factor used in compressing the image in the field are stored in the video tape. When the image in the field is reproduced, the compression data in the field is expanded using the quantization scale factor recorded on the video tape.

According to the above-mentioned embodiment, the compression rate for obtaining the amount of coding corresponding to the target amount of coding is obtained for each of the monitoring cameras 101 to 104. Accordingly, the compression rate suitable for each of the monitoring cameras 101 to 104 is obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. A digital recording apparatus to which a signal obtained by subjecting signals on a plurality of video camera channels to time division multiplexing is inputted, comprising:

recording mode setting for causing a user to select one of a plurality of recording modes corresponding to a recording time period;

first storage means for storing, for each of the recording modes, a target amount of coding per field for the recording mode and a compression rate corresponding to the target amount of cording;

second storage means having a by-channel compression rate storage area for storing the compression rate for each of the plurality of video camera channels;

initial value setting means for setting the compression rate corresponding to the target amount of coding for the recording mode selected by the recording mode setting means, as an initial compression rate in each of the by-channel compression rate storage areas in the second storage means;

compression means for performing, every time the signal corresponding to one field is inputted, compression processing using the compression rate stored in the by-channel compression rate storage area, corresponding to the inputted signal, in the second storage means; and compression rate control means for updating, every time the signal corresponding to one field has been compressed by the compression means, the compression rate stored in the by-channel compression rate storage area, corresponding to the inputted signal, in the second storage means to such a value that an amount of coding after the compression approaches the target amount of coding on the basis of the amount of coding after the compression and the target amount of coding corresponding to the recording mode selected by the recording mode setting means.

2. A digital recording apparatus to which a signal obtained by subjecting signals on a plurality of video camera channels to time division multiplexing is inputting, comprising:

a recording mode setting circuit for causing a user to select one of a plurality of recording modes corresponding to a recording time period, a first storage device for storing, for each of the recording modes, a target amount of coding per field for the recording mode and a compression rate corresponding to the target amount of cording;

a second storage device having a by-channel compression rate storage area for storing the compression rate for each of the plurality of video camera channels;

an initial value setting circuit for setting the compression rate corresponding to the target amount of coding for the recording mode selected by the recording mode setting circuit, as an initial compression rate in each of the by-channel compression rate storage areas in the second storage device;

a compression circuit for performing, every time the signal corresponding to one field is inputted, compression processing using the compression rate stored in the by-channel compression rate storage area, corresponding to the inputted signal, in the storage device; and a compression rate control circuit for updating, every time the signal corresponding to one field has been compressed by the compression circuit, the compression rate stored in the by-channel compression rate storage area, corresponding to the inputted signal, in the second storage device to such a value that an amount of coding after the compression approaches the target amount of coding on the basis of the amount of coding after the compression and the target amount of coding corresponding to the recording mode selected by the recording mode setting circuit.

* * * * *